US006230641B1

(12) United States Patent
Savelli

(10) Patent No.: US 6,230,641 B1
(45) Date of Patent: May 15, 2001

(54) PROCESS FOR PRODUCING A CONVEX SAIL OR A TENSILE STRUCTURE

(76) Inventor: Marco Savelli, V. le Antignano 26, 57100, Livorno (IT)

( * ) Notice: Subject to any disclaimer, the term of this patent is extended or adjusted under 35 U.S.C. 154(b) by 0 days.

(21) Appl. No.: 09/554,399

(22) PCT Filed: May 21, 1998

(86) PCT No.: PCT/IT98/00127

§ 371 Date: May 15, 2000

§ 102(e) Date: May 15, 2000

(87) PCT Pub. No.: WO99/25612

PCT Pub. Date: May 27, 1999

(30) Foreign Application Priority Data

Nov. 13, 1997 (IT) .............................................. RM97A0701

(51) Int. Cl.⁷ .................................................... B63H 9/04
(52) U.S. Cl. .................. 114/102.29; 114/102.31
(58) Field of Search ............................ 114/102.1, 102.29, 114/102.31

(56) References Cited

U.S. PATENT DOCUMENTS

| | | | |
|---|---|---|---|
| 5,038,700 | * | 8/1991 | Conrad ............................ 114/102.31 |
| 5,097,783 | * | 3/1992 | Linville ........................... 114/102.31 |
| 5,097,784 | * | 3/1992 | Baudet ............................ 114/102.31 |
| 5,333,568 | * | 8/1994 | Meldner et al. ................ 114/102.31 |
| 5,355,820 | * | 10/1994 | Conrad et al. .................. 114/102.31 |
| 6,112,689 | * | 9/2000 | Baudet ............................ 114/102.31 |

FOREIGN PATENT DOCUMENTS

| | | |
|---|---|---|
| 0 224 729 | 6/1987 | (EP) . |
| 0 475 083 | 3/1992 | (EP) . |
| 0 488 870 | 6/1992 | (EP) . |
| 2 565 157 | 12/1985 | (FR) . |
| WO 87/07233 | 12/1987 | (WO) . |

OTHER PUBLICATIONS

By S. Goelnitz, "Dem Original Auf Den Fersen", Surf Magazin, vol. 21, No. 6, Jun. 1997, pp. 36 and 37.

* cited by examiner

Primary Examiner—Stephen Avila
(74) Attorney, Agent, or Firm—Young & Thompson

(57) ABSTRACT

A process for modelling a sail with a sandwich configuration and a three-dimensional convex shape, wherein the "mould" is formed by a semirigid film material which has a shape identical to that of the sail to be produced. On this kind of "parent sail", a cloth is prepared by adhering, by means of a removable adhesive, synthetic weft (1) and warp (2) filaments onto the "parent sail". This cloth will form the inner layer of the final "sandwich". Two thin external plastic laminates are applied on the cloth, one on each side, after removal of the cloth from the "parent sail". The thin external plastic laminates are applied in individual pieces adapted to follow the convexity of the cloth. The application of the external laminates is performed on a plane support.

7 Claims, 1 Drawing Sheet

PROCESS FOR PRODUCING A CONVEX SAIL OR A TENSILE STRUCTURE

TECHNICAL FIELD

The present invention relates to a triangular or trapezoidal sheet which can be utilized as a sail for sailboats. As already known, modern sheets used as sails for sailboats, are preferably produced in the form of a sandwich structure, in which two external plastic laminates are joined by an appropriate adhesive material or in another way, enclosing therebetween reinforcement filaments made of Kevlar, Spectra, Polyester or some other kind of resistant synthetic material.

BACKGROUND ART

According to the the prior art, plastic filaments are laid in thread groups, using an automated mechanism, onto a plastic film previously put on a convex and rigid mould, and subsequently they are covered by a second film having the same features as the first one. A considerable drawback of known production processes lies in the complexity of the automated plant, comprising the rigid adjustable mould and the robot which puts the reinforcement filaments on the first plastic laminate laid onto the rigid convex mould. In order to allow the adjustment of the mould, the latter must be provided with a plurality of flexible fillets or strips, which are nevertheless substantially rigid and which are provided with associated pneumatic cylinders to be adjusted individually depending on the value of the sail's camber.

Further problems must be faced when a different mould must be constructed for a sail of different size.

DISCLOSURE OF THE INVENTION

An object of the present invention is to realize a sail production process, which is less expensive than the traditional process, by replacing the known rigid mould, with a mould which in the following description will be called the "parent sail" ("loom").

This definition is useful to emphasize—not only in terms of costs—the difference with respect to the traditional rigid and adjustable mould.

Another most important object of the present invention is that of realizing a "cloth" on said parent sail. In fact, the "parent sail" is a "fictitious sail" made of thermoplastic material, for instance a polyester film, which is much thicker than a plastic laminate used in practice to make sails. The parent sail is only used for the purpose of modelling, according to the desired camber and dimensions, a cloth made of reinforcement filaments (Kevlar, Spectra, polyester, etc.), which is to be introduced between the plastic laminates of the sail, in order to form a "sandwich".

Since the parent sail has a negligible cost with respect to known adjustable rigid moulds, it may be realized according to different shapes (cambers) and different dimensions corresponding to those of known sails for sailboats. Preferably, a polyester film of 250 micron of thickness (10 mils) will be used, which forms a common extrusion material of a commercial kind.

Once the cloth has been realized, which is very different from the ensemble of reinforcement filaments arranged between the plastic laminates in a traditional sail—as will be explained afterwards—conventional (vacuum) techniques will be used for applying the thin external plastic laminates.

BRIEF DESCRIPTION OF DRAWINGS

The present invention will be illustrated in more detail with reference to a preferred embodiment thereof, which is shown in FIG. 1, only for illustrative and non-limitative purposes.

BEST MODE OF CARRYING OUT THE INVENTION

Figure 1:
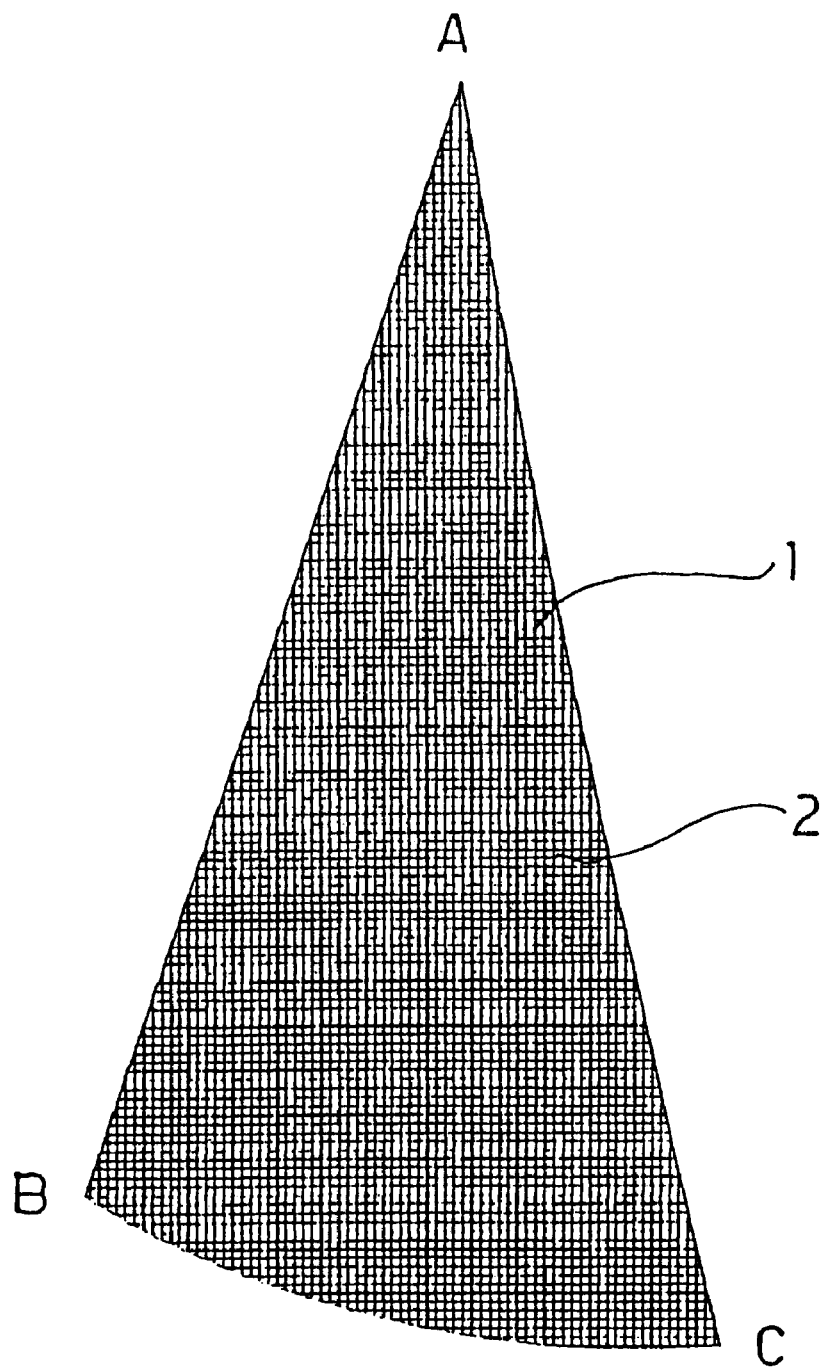
FIG. 1 shows the structural cloth obtained on the "parent sail", which is afterwards introduced, like in a "sandwich", between two outer plastic laminates, in order to form the sail.

In the present process, the "parent sail" is realized in the same way as a sail made of a very thin plastic laminate, according to the traditional process.

The camber of the parent sail and its dimensions will obviously be identical with those of the sail to be obtained.

Once the parent sail has been realized, the cloth is formed on the same, and this cloth will constitute the inner layer of the sandwich forming the sail to be realized.

The cloth is made to adhere to the parent sail by means of a quick setting removable adhesive, so that it remains "welded" thereon, and so that each thread will have the desired length according to the arc whereon it lies.

Once this operation is terminated, and after having obtained the desired triangular cloth, which is shown in FIG. 1, the cloth will be removed from the parent sail and the vacuum lamination will start according to known techniques.

The cloth (FIG. 1) is much thicker (more closely woven) than the net of reinforcement filaments of the known processes. The cloth includes a warp 2 and a weft 1. FIG. 1 shows a homogeneous-type cloth having the same size as the sail and including a weft 1 and a warp 2, wherein two close parallel filaments of the warp and the weft, are preferably arranged at a distance less than 1 cm.

Each lateral plastic laminate of the sandwich, which is not shown in FIG. 1, is not made of a single piece. Actually, each laminate is applied on the perfectly pliable cloth (FIG. 1), in pieces of about 1 meter of height and variable length.

The cloth will be arranged onto a plane support, and since the cloth has a convex shape, the respective piece of plastic laminate will have a length varying according to where the piece of plastic laminate must be applied, on condition that it can follow the local convexity of the cloth. It is obvious that pieces having the greatest possible length and ensuring at the same time perfect adherence of the individual piece of plastic laminate to the cloth will be used in the production process.

Industrial Applicability

The advantage of the present invetion is that once the cloth has been prepared, the latter forms a valid three-dimensional support, which is perfeclty pliable and made of close filaments, whereon it is possible to apply, one at a time, on a plane, the two external plastic laminates.

The process of the present invention is not limited to the specific configuration of the cloth which is shown in FIG. 1.

It is obvious that the plastic laminates are those normally used in this field, e.g. with the required elasticity, reduced weight, high mechanical resistance, resistance to heat, UV rays and optimum imperviousness. In this case and in the case of the cloth, many different materials known to those skilled in the art may be employed, so that it is worthless to mention them explicitly.

It is also evident that in the above description nothing has been said about other already known operations, like e.g. the application of suitable reinforcements at the sail's corners A,B,C, or the like.

What is claimed is:

1. A process for producing a sail or a cover element of a tensile structure having a triangular or trapezoidal form, characterized in that on a parent sail consisting of a semi-rigid film material of the same shape and size as that of the desired product, a thick cloth of synthetic filaments is formed, including horizontal weft filaments (1) and vertical warp filaments (2), the said cloth being made to adhere to the parent sail by means of a removable adhesive and being used for applying thereon two external plastic laminates, after the said cloth has been removed from the parent sail, wherein the external plastic laminates are applied in individual pieces on both sides of the cloth, in such a way as to adapt themselves and follow the local convexity of the cloth, and this operation is carried out on a plane support.

2. A process for producing a sail or an element of a tensile structure according to claim 1, characterized in that the distance between the synthetic weft filaments (1) is less than 1 cm, and that between the synthetic warp filaments (2) is also less than 1 cm.

3. A process according to claim 2 characterized in that the thickness of the parent sail is about 250 micron (10 mils).

4. A process according to claim 1, characterized in that the height of the pieces which form each external plastic laminate is equal to about 1 m.

5. A sail or element of a tensile structure, having a polygonal form, produced according to the process of claim 1, comprising two external plastic laminates, which are formed by a plurality of pieces, wherein said pieces are joined to each other at their edges, and comprising also an inner convex-shaped cloth, which is flexible and has the same form and size of the sail to be realized; the said cloth including horizontal synthetic weft filaments (1) and vertical synthetic warp filaments (2), arranged in such a way as to form a homogeneous cloth.

6. A sail or an element of a tensile structure, according to claim 5, characterized in that the mutual distance between the weft filaments (1) is less than 1 cm, and the distance between the warp filaments (2) is also less than 1 cm.

7. A sail according to claim 6, characterized in that the pieces which form the external plastic laminates of the sail's "sandwich", have a size allowing them to follow the curvature of the flexible internal cloth without folds and crease.

* * * * *